Figure 1:
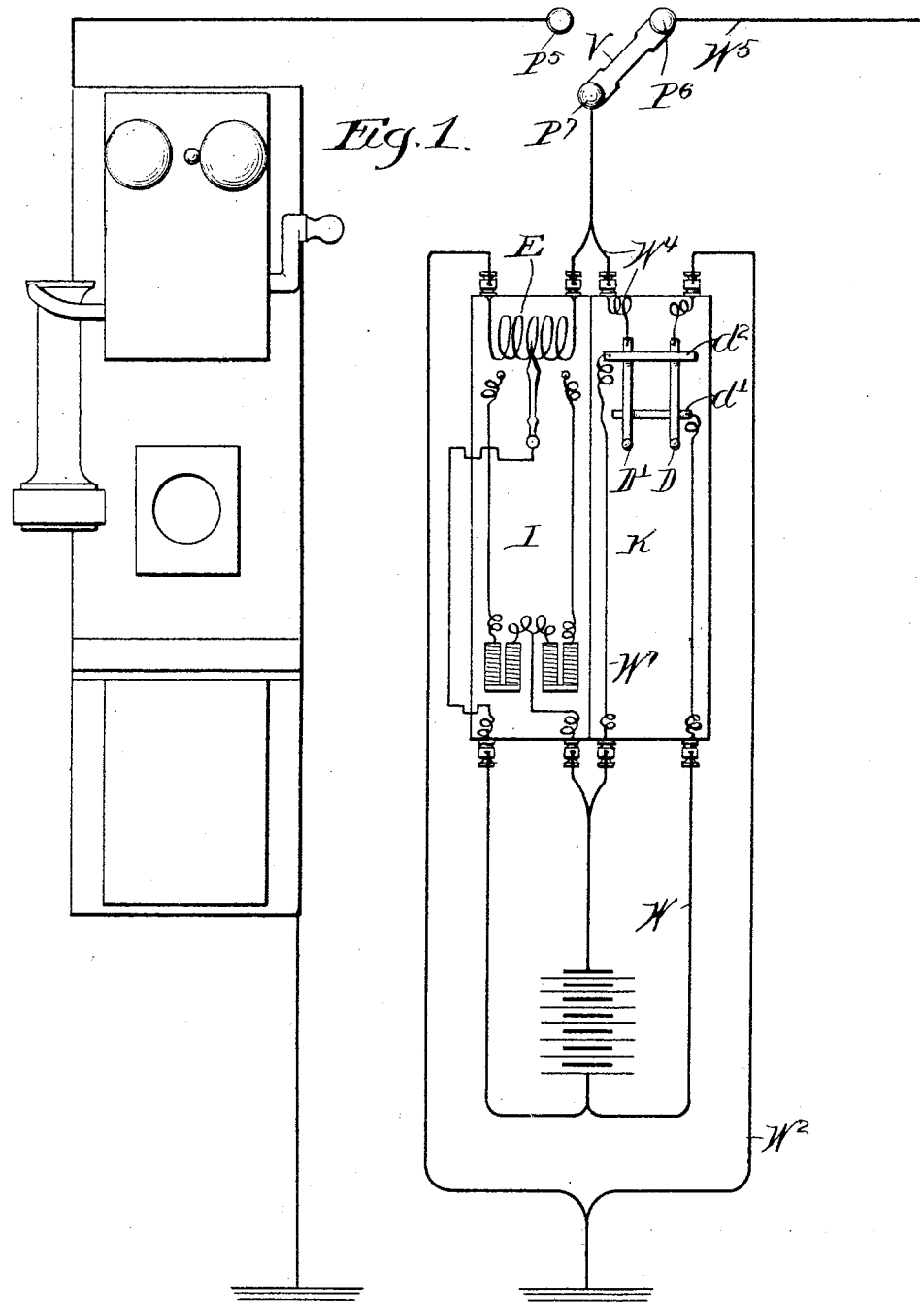

(No Model.)

W. B. THOMSON.
TELEPHONE CALL RECORDER.

No. 512,413.    Patented Jan. 9, 1894.

Witnesses:
Charles A. Hervey
N. A. Rogers

Inventor:
William B. Thomson
by Niles Garner Bitner
his Attorneys (No Model.) 9 Sheets—Sheet 3.

W. B. THOMSON.
TELEPHONE CALL RECORDER.

No. 512,413. Patented Jan. 9, 1894.

Witnesses:
Charles Harvey
N. A. Rogers.

Inventor:
William B. Thomson
by Wilkinson & Fisher
Attorneys

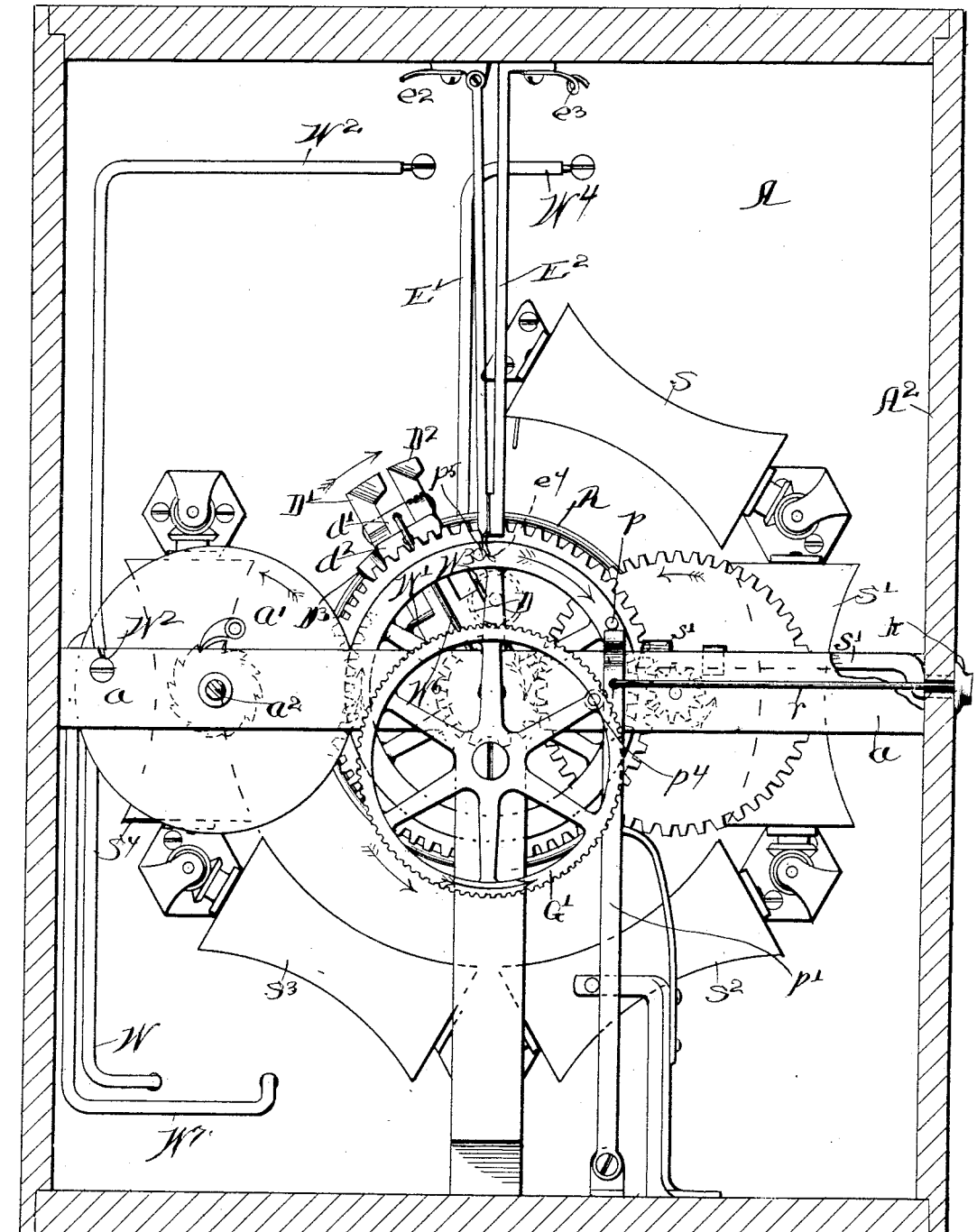

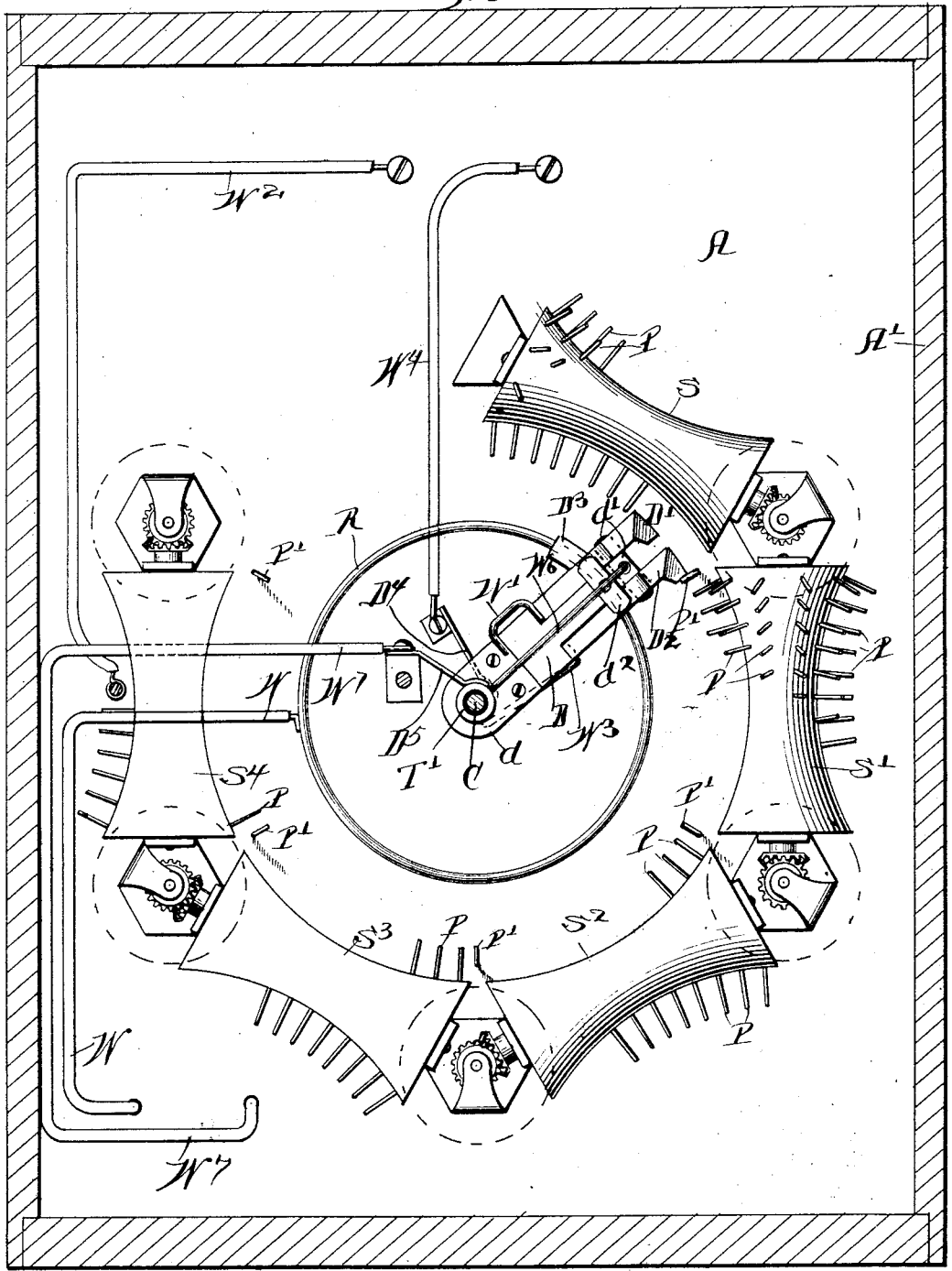

(No Model.) 9 Sheets—Sheet 6.
W. B. THOMSON.
TELEPHONE CALL RECORDER.
No. 512,413. Patented Jan. 9, 1894.
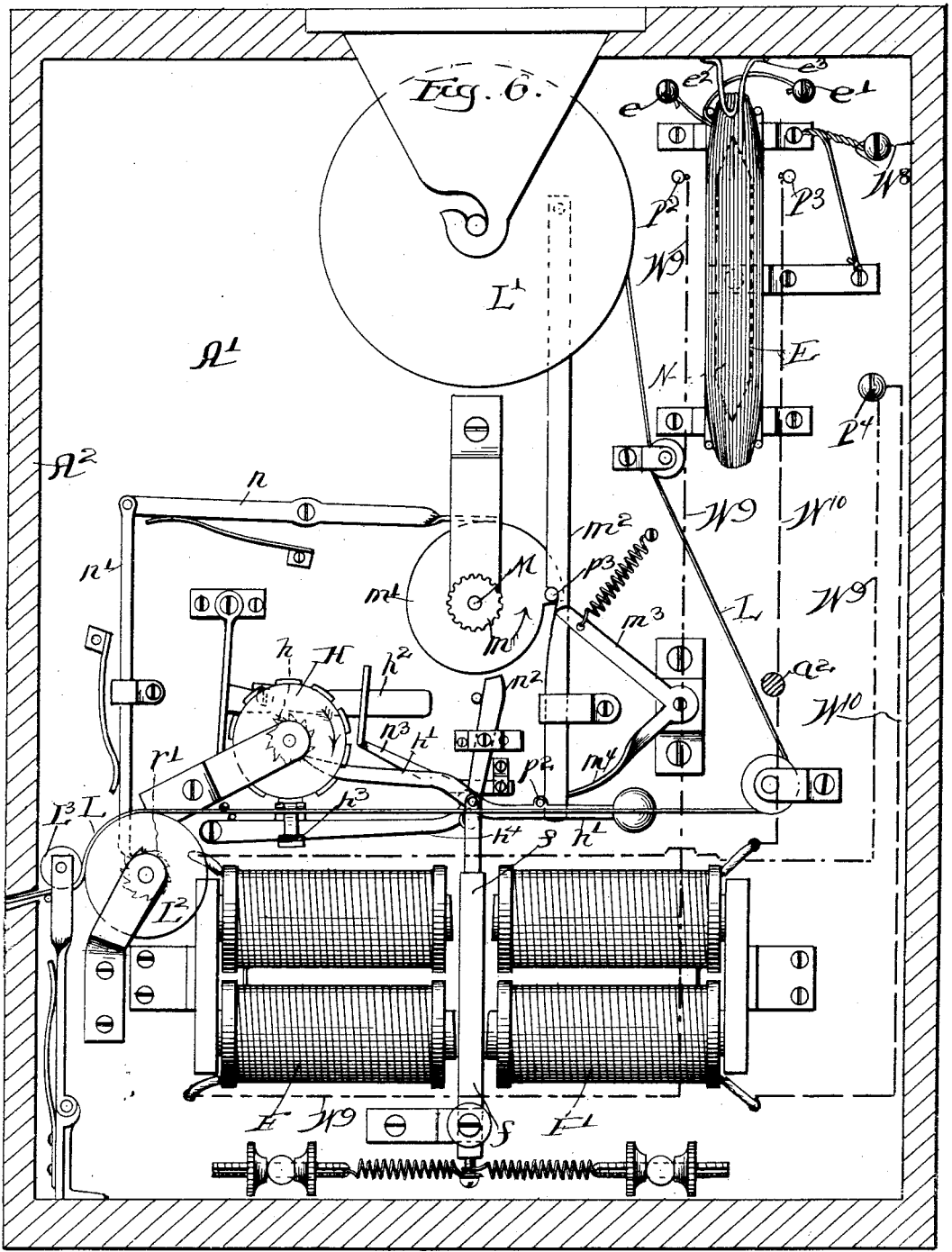
Witnesses:
Charles D. Hervey.
N. A. Rogers.
Inventor:
William B. Thomson
by Niles Garner & Pitou
Attorneys.

(No Model.) 9 Sheets—Sheet 7.
W. B. THOMSON.
TELEPHONE CALL RECORDER.
No. 512,413. Patented Jan. 9, 1894.
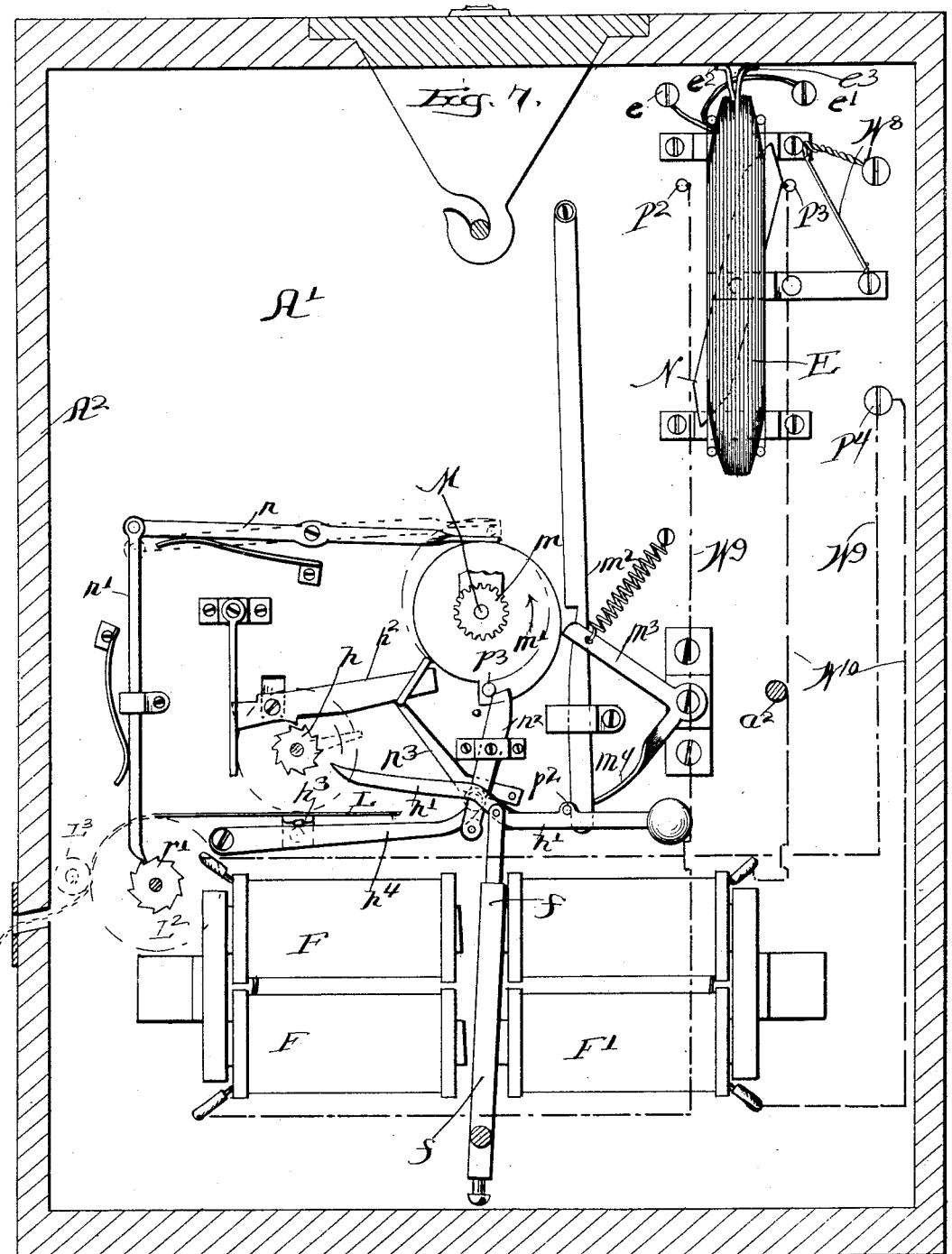

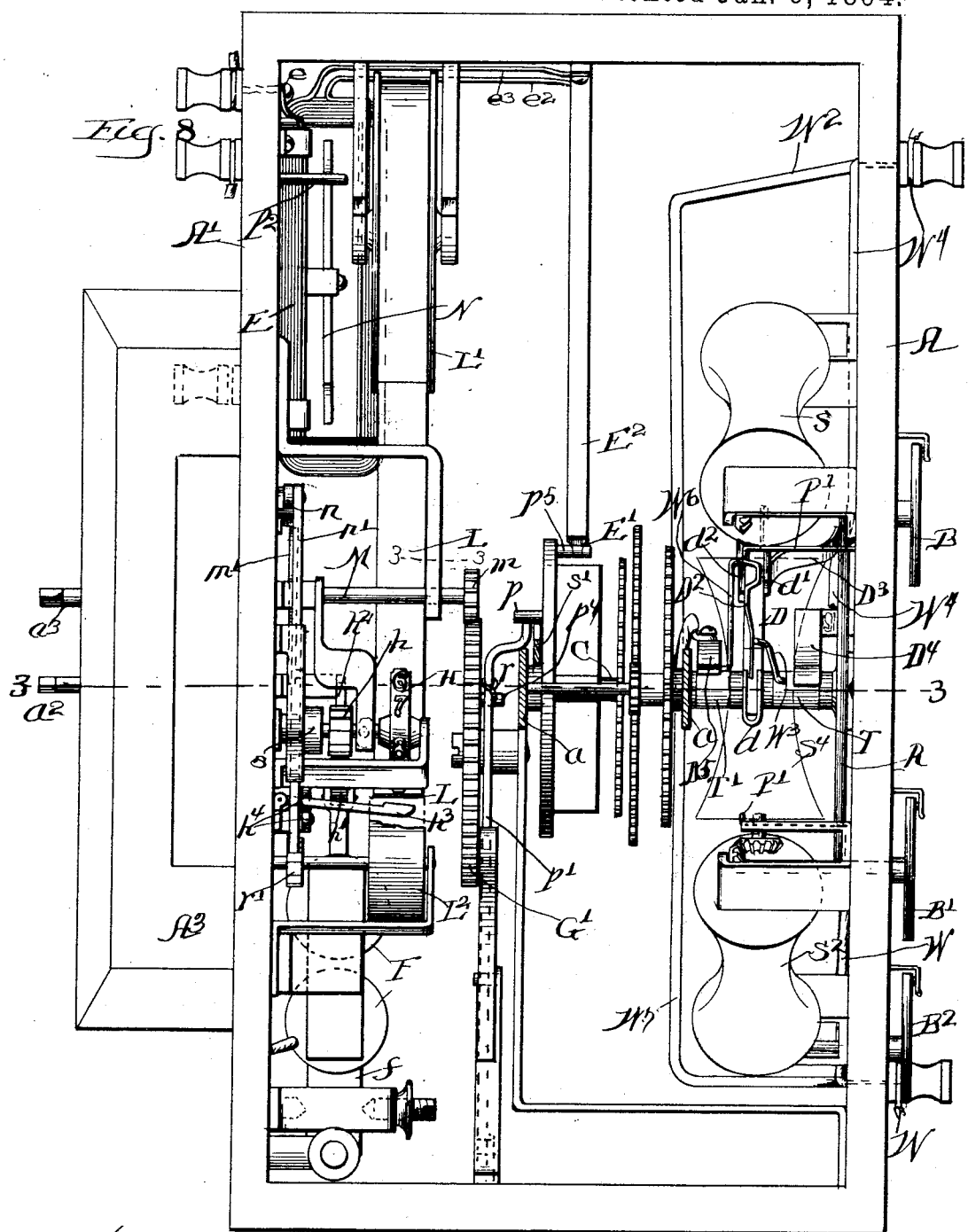

(No Model.)  
9 Sheets—Sheet 9.
W. B. THOMSON.
TELEPHONE CALL RECORDER.
No. 512,413. Patented Jan. 9, 1894.
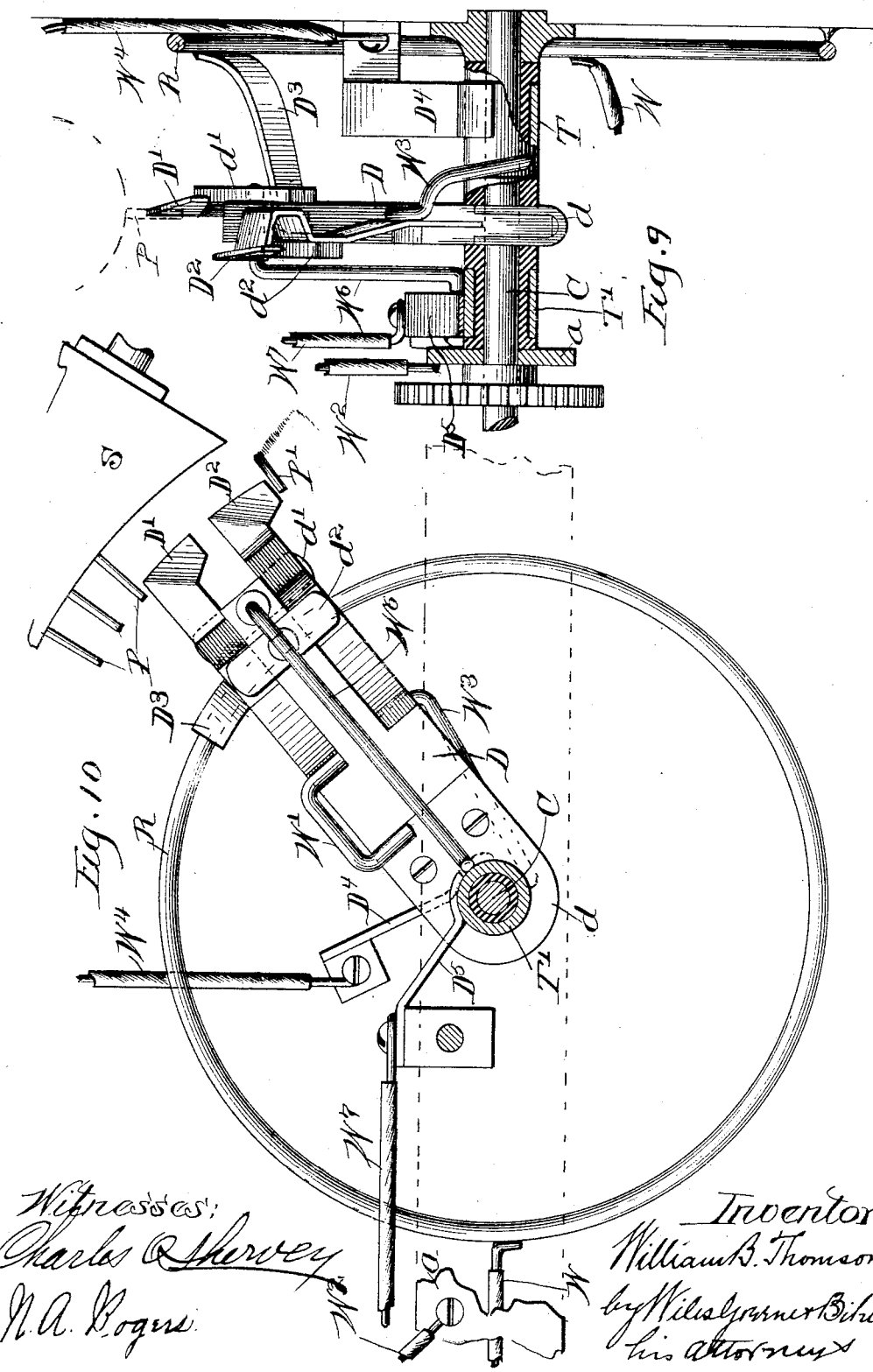
Witnesses:
Charles Q. Hervey
N. A. Rogers
Inventor:
William B. Thomson
by Wilse Garner Behun
his attorneys

UNITED STATES PATENT OFFICE.

WILLIAM B. THOMSON, OF CHICAGO, ILLINOIS, ASSIGNOR OF ONE-HALF TO SYLVANUS HEERMANS, OF SAME PLACE.

TELEPHONE-CALL RECORDER.

SPECIFICATION forming part of Letters Patent No. 512,413, dated January 9, 1894.

Application filed June 28, 1893. Serial No. 479,024. (No model.)

*To all whom it may concern:*

Be it known that I, WILLIAM B. THOMSON, a citizen of the United States of America, residing at Chicago, in the county of Cook and State of Illinois, have invented certain new and useful Improvements in Telephone-Call Recorders, of which the following is a specification.

My invention relates to improvements in telephony, and more particularly to the construction of a device for recording telephone-calls, the primary object of the invention being to provide a means whereby the number of the calling telephone may be recorded at the called telephone when the call is not answered.

A further and equally important object of the invention is to so construct the device, that after the recording at the called telephone of the number of the calling telephone, the operation may be automatically reversed and a record may be made at the calling telephone of the number of the called telephone, or any other number having either an evident or an arbitrary significance, the number so recorded being predetermined by suitably setting that part of the device which is at the called telephone. In the use of the device a record will be kept at any given called telephone of the numbers of the telephones through which it is called during the absence of its owner; and usually the number of the called telephone will be transmitted in reply to each of the telephones and will be recorded at each. The owner of any telephone may, however, before leaving it set its recording device upon any number other than its own and the number upon which it is so set will be transmitted to each of the telephones during his absence. The number on which the recording device is set may be, for instance, the number of another telephone at the place to which he is going and through which he may be reached, or it may be a number indicating the hour and minute at which he will return, or an arbitrary number having a meaning fixed by a predetermined code.

The invention is fully described and explained in this specification and shown in the accompanying drawings, in which—

Figure 2:
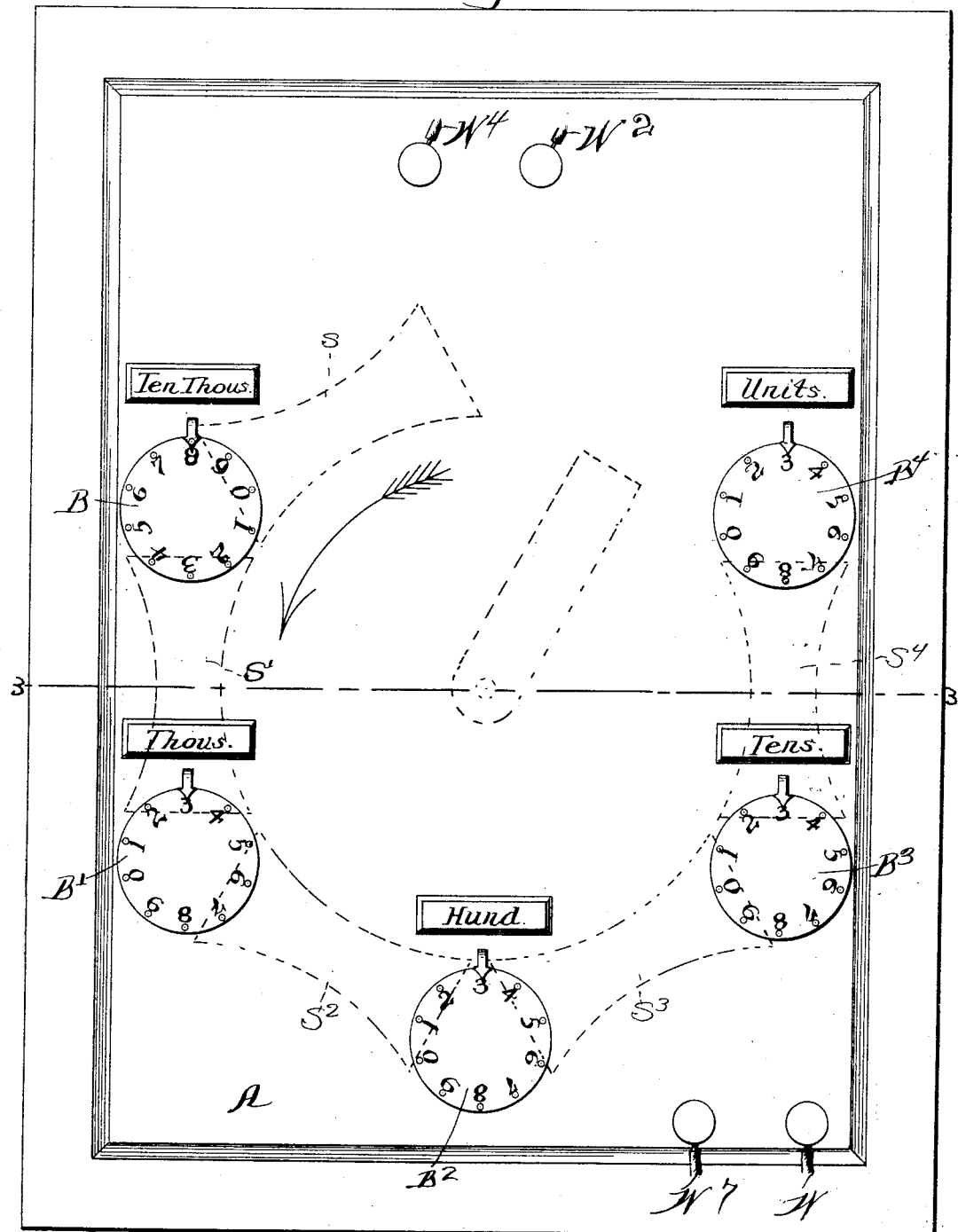
Figure 3:
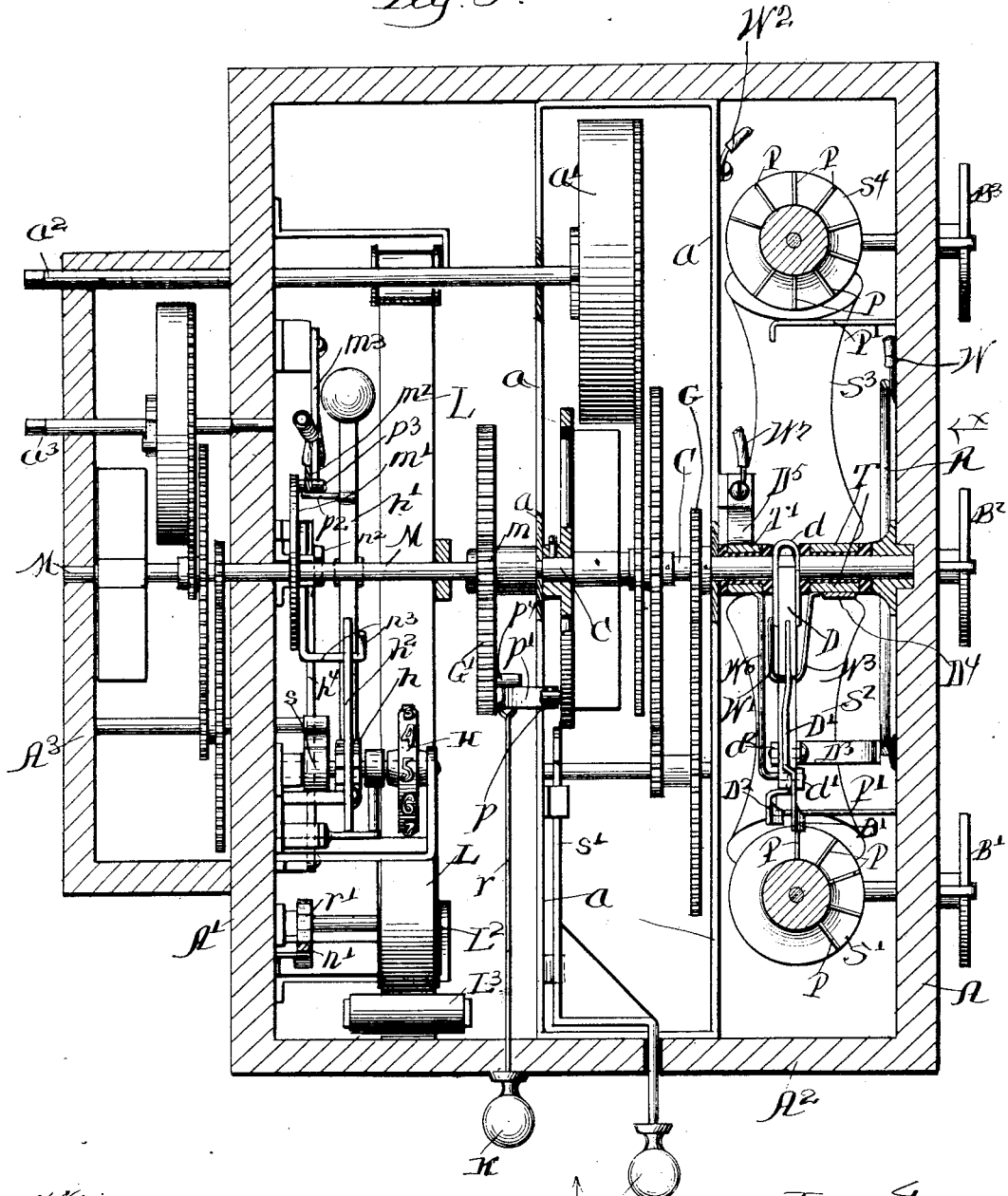

Figure 1 is a graphic representation of a circuit including a transmitter and recorder constructed in accordance with my invention. Fig. 2 is a side elevation of the device intended to be placed at a telephone, including transmitting and recording mechanism adapted to co-operate with corresponding parts at another telephone, the view being in the direction indicated by the arrow $x$, Fig. 3. Fig. 3 is a horizontal section of the parts shown in Figs. 1 and 2, the view being downward and the plane of section being through the line 3—3, Figs. 2 and 8, the shaft, M, of the recording device and the pinion mounted thereon being shown, though above the plane of section. Fig. 4 is an internal elevation of the transmitting mechanism of the device being that portion attached to the wall, A, of the case as shown in Figs. 3 and 8. Fig. 5 is a similar view with certain parts removed. Fig. 6 is an internal elevation of the recording mechanism of the device, being the portion attached to the wall, A', of the case as shown in Figs. 3 and 8. Fig. 7 is a similar view showing the parts in a different position. Fig. 8 is a front elevation of the entire device, the front of the case being removed. Figs. 9 and 10 are enlarged detail views of the rotating arm, D, and its brushes, together with the immediately co-operating parts.

In the views, A, A' are the opposite side walls, and $A^2$ is the front wall of a case adapted to contain a transmitting mechanism and a recording mechanism adapted to co-operate with similar parts at another station, the recording mechanism at each station being actuated by the transmitting mechanism at the other station. The transmitting mechanism at one station and the recording mechanism at another, constitute a complete working device for transmitting the number of one telephone to another and recording it, but the second transmitter and recorder are required for sending the number of the receiving telephone in the opposite direction in the manner hereinbefore set forth. As the parts at one end of a line are duplicates of those at the opposite end, the drawings will be referred to in describing the connection of a transmitter with the recorder at the opposite end of the line, and also in describing the relation of the transmitter to the recorder connected directly with it in the manner shown in the different figures.

On the side wall, A, of the case is secured a series of dials, B, B', B², B³, B⁴, provided with suitable spindles extending through and pivoted in the wall, each of the dials being marked with the ten digits and provided with a suitable stationary pointer for indicating one of the digits, so that the dials may be set to indicate any number below one hundred thousand. The inner ends of the spindles of the dials are provided with miter gears which engage similar gears mounted on the ends of the shafts of a series of spools, S, S', S², S³, S⁴, as shown in Fig. 4, the shafts being so placed as to coincide with chords of a circle lying in a plane parallel to the wall, A, and the spools being of such form that the inner margins of their sections in the plane of the circle are arcs equidistant from the center of the circle. Each of the spools is divided circumferentially into ten equal spaces extending throughout its entire length and on the longitudinal lines separating the spaces on each spool are arranged rows of pins, P, P, one of the lines on each spool being vacant, and the pins on the other lines being placed in sets increasing regularly in number from one to nine. The spools may evidently be rotated by rotating the dials, and the digits on the dials are so arranged with reference to the pins upon the spools that when any given digit upon one of the dials registers with the corresponding pointer, the corresponding spool is in such a position that the line of pins corresponding in number to the indicated digit on the dial lies in the plane of the circle above referred to and on the side of the spool nearest the center thereof. Between the spools, or opposite the spaces between them is placed a series of stationary pins, P', P', set in the wall, A, and having their ends bent into a plane parallel to the wall, but preferably farther from the wall than the plane of the circle into which the lines of pins on the spools are brought as above set forth.

In suitable bearings supported by the wall, A, and by a metal frame, a, attached to the front and rear walls of the case, is journaled a horizontal shaft, C, provided with a gear-wheel, G, and connected by means of a train of gearing shown in Figs. 3 and 4, with a drum, a', which contains a spring adapted to be wound up by means of an arbor, a², projecting through the wall, A'. The drum a', tends to rotate in the direction indicated by the arrow thereon in Fig. 4, and to rotate the shaft, C, in the same direction. One of the wheels of the train is however provided with a pin, p, Fig. 4, and a swinging pawl, p', is so arranged as normally to form a stop for said pin and prevent rotation of the gearing. A knob, k, Figs. 1 and 4, is connected by a rod, r, with the swinging pawl and may be drawn outward to release the pin, p, and permit rotation of the train of gearing and of the shaft, C.

On the shaft, C, is rigidly mounted an arm, D, of non-conducting material adapted to rotate with the shaft and provided at its inner end with a plate, d, of suitable conducting metal forming an electrical contact with the shaft. The outer end of the arm, D, is provided with two plates, d', d², of conducting metal, the plate, d', being on the side nearest the wall, A, and the plate, d², being on the opposite side of the arm.

Between the two plates, d', d², lie two brushes, D', D², fastened to the arm, D, and both normally in contact with the plate, d². The free ends of the two brushes are at different distances from the wall, A, of the case, the end of the brush, D', being adapted as it rotates to make contacts with the pins, P, P, lying in the plane of the circle about which they are arranged in the manner hereinbefore described, and the end of the brush, D², being adapted to make contact with the stationary pins, P', P', placed between the spools as hereinbefore set forth. The ends of the brushes, D', D² are inclined with reference to the planes of their rotation as indicated in Figs. 3 and 5, so that each brush as it passes a pin with which it makes contact, is pressed away from the plate, d², and against the plate, d'. It is evident that if the spring in the drum, a', be wound up, the pawl, p', and the arm, D, being in the position indicated in Fig. 4, the knob, k, may be drawn outward to release the pin, p, of the train of gearing and the drum will then rotate, rotating the shaft and carrying the arm, D, about the circle. As the arm rotates, the brush, D', will make contact with all the pins of the first spool lying in its path after which the brush, D², will make contact with the pin, P', lying between the first two spools and this process will be repeated until the brush, D', has passed the pins of all the spools, and the brush, D², has passed the stationary pins lying in its path.

As has already been said, each contact of either of the brushes, D', D², with one of the pins, P, P', presses the brush against the plate, d', on the arm, D, and this contact of the brush with the plate closes each time an electric circuit which includes the telephone wire, a suitable battery and a galvanometer, E, supported by the wall, A', of the case at the opposite end of the line and forming a part of the recording mechanism.

The galvanometer is provided with a needle, N, adapted to be deflected in one direction or the other according to the direction of the current passing through its coil and thus to be brought into contact with either one of two pins, P², P³, lying on opposite sides of it.

The entire arrangement of the electric circuit is hereinafter fully explained, but it is sufficient to say at this place that the contact of the brush, D', with the plate, d', closes a circuit sending a current in one direction through the coil of the galvanometer and the contact of the brush, D², with the plate closes a circuit which sends a current in the opposite direction through the galvanometer coil.

The needle of the galvanometer is normally in the position indicated in dotted lines in Fig. 6, and when in that position performs no function whatever, but when deflected by the passage of a current through the galvanometer coil, and brought into contact with either of the pins, $P^2$, $P^3$, it closes one of two auxiliary circuits which include two electro-magnets, F, F', Figs. 6, and 7, supported by the wall, A', which supports the galvanometer. Between the electro-magnets lies an armature, $f$, adapted to be drawn toward the poles of either magnet when energized by the passage of an electric current, and it is evident that the armature will be drawn in either direction according to the deflection of the needle, N, and its contact with the pin, $P^2$, or $P^3$. The brushes, D', $D^2$, and the circuits which they complete, are so arranged that as the brush, D', passes one of the pins, P, upon the spool, the current passed through the galvanometer coil deflects the needle, N, so as to bring it against the pin, $P^2$, and pass a current through the electro-magnet, F, thereby drawing the armature, $f$, against its poles, while, on the other hand, the passage of the brush, $D^2$, across one of the pins, P', reverses the current passing through the galvanometer coil, deflects the needle in the opposite direction, brings it against the pin, $P^3$, energizes the magnet, F', and draws the armature in the opposite direction.

On a suitable shaft mounted in bearings supported by the wall, A', is a type-wheel H, Figs. 3 and 6, having on its margin the ten digits from 0 to 9 at regular intervals. On the shaft of the type-wheel is rigidly mounted a ratchet-wheel, $h$, Fig. 3, and a pawl, h', Figs. 3, 6, and 7, pivoted to the armature, $f$, engages this ratchet-wheel and serves to rotate it in the direction indicated by the arrow on the type-wheel in Fig. 6, each time that the armature is drawn toward the magnet, F. A second pawl, $h^2$, prevents accidental reverse rotation of the ratchet-wheel, and a spring, $s$, Fig. 3, tends to impart reverse rotation to the ratchet-wheel when the pawl, $h^2$, is drawn out of engagement therewith. When all the parts are in their normal positions, the zero digit on the type-wheel is at the lowest point of the wheel and is directly above a block, $h^3$, supported by a vertically oscillating lever, $h^4$. A paper-tape, L, wound about a suitably supported drum, L', Fig. 6, passes around suitable guide-rollers and between the type-wheel and the block, $h^3$, the end of the tape being carried between a feed-roll, $L^2$, and a pressure roll, $L^3$, which are adapted to draw it forward. It is evident that as the brush, D', passes across each of the pins on one of the spools, S, S', &c., it sends an impulse through the electro-magnet, F, draws the armature, $f$, toward the magnet, actuates the pawl, h', and rotates the type-wheel through one space; and that in its passage along any given spool, the brush will cause the type-wheel to be rotated through a number of spaces corresponding to the number of pins in the line presented to the brush, and will thereby present to the block, $h^3$, the digit on the type-wheel corresponding to the number of pins in the line.

Above the electro-magnets, F, F', is a shaft, M, journaled in suitable bearings and provided at its inner end with a pinion, $m$, whose use is hereinafter explained, the opposite end of the shaft being carried through the wall, A', of the case and into a supplemental case, $A^3$, where it engages a train of clock-work shown in Fig. 3, and adapted to be wound by means of an arbor, $a^3$. The shaft, M, bears a cam, m', Figs. 6 and 7, and the clock-work with which it is connected tends to rotate it in the direction indicated by the arrow on the cam in Figs. 6 and 7. The cam is provided with a pin, $p^3$, which normally lies in a notch in an oscillating pawl lever, $m^2$, and thereby prevents rotation of the shaft and eccentric, the parts being shown in their normal position in Fig. 6. The lower end of the pawl is pressed toward the cam by a bell-crank lever, $m^3$, $m^4$, actuated by a suitable spring, and it rests against a pin, $p^2$, projecting transversely from the pawl, h', which is pivoted to the armature, $f$, as above set forth. After the passage of the brush, D', along the line of pins upon a spool as above described, the brush, $D^2$, strikes the stationary pin, P', lying immediately beyond the spool over which the brush, D', has passed. In its passage across the pin the brush is pressed against the plate, d', and thereby passes a current through the galvanometer coil in such a direction as to swing the needle, N, against the pin, $p^3$, and close a circuit including the magnet, F', thereby drawing the armature, $f$, against the poles of said magnet and moving the pawl, h', away from the type-wheel. This movement of the pawl moves the pin, $p^2$, correspondingly and swings the pawl lever, $m^2$, away from the cam, m', thereby releasing the pin, $p^3$, and permitting rotation of the cam. Upon the upper margin of the cam rests one end of a lever, $n$, whose opposite end is pivoted to a vertically sliding pawl, n', engaging a ratchet-wheel, r', on the shaft of the feed-roll $L^2$. As the cam rotates, it raises the free end of the lever, $n$, thereby pushing the opposite end downward and actuating the pawl, n', so as to rotate the ratchet-wheel, r', and feed-roll, $L^2$, sufficiently to move the tape through a suitable feed-space. A further rotation of the cam brings the pin, $p^3$, against the upper end of a lever, $n^2$, pivoted near its middle and carrying at its lower end a roller projecting transversely beneath the free end of the lever, $h^4$. The pressure of the pin, $p^3$, against the upper end of the lever, $n^2$, swings the lower end thereof and the roller carried by it, toward the type-wheel thereby raising the free end of the lever, $h^4$, pressing the block, $h^3$, upward against the tape and forcing the tape against the type at the lowest point of the type-wheel which thus prints an impression upon the tape. The lever, $h^4$, carries a second roller placed a short distance from its fore end and extending transversely beneath a vertically oscillating lever, $n^3$, one of whose ends is pivoted to a stationary support, while its opposite end lies beneath the free end of the pivoted pawl, $h^2$. The movement of the lever, $n^2$, which raises the lever, $h^4$, also raises the lever, $n^3$, and immediately after the printing of an impression upon the tape the lever, $n^3$, lifts the pawl, $h^2$, out of engagement with the ratchet-wheel on the type-wheel shaft. The release of the ratchet-wheel permits the type-wheel to rotate under the influence of the spring, $s$, and brings it to its normal position when it is ready to be again rotated step by step through the successive contacts of the brush, D', with the pins of the next succeeding spool. It is evident that through the means thus described, the complete rotation of the arm, D, of the transmitting mechanism at one end of a line must cause the recording mechanism at the opposite end of the line to print upon its tape the number indicated by the digits on which the different dials of the transmitting mechanism are set, and that the primary object of my device is thus accomplished. It is evident that each complete rotation of the arm, D, of the transmitting mechanism at the calling telephone acts through the means and in the manner hereinbefore described to produce five complete rotations of the shaft, M, pinion, $m$, and cam, $m'$. The recording mechanism of each complete device is not only in electrical connection with the transmitter at the opposite end of the line, but is also mechanically connected with the transmitter at its own end of the line by means of the shaft, M, and pinion, $m$, the pinion being in engagement with a loosely mounted gear-wheel, G', supported by the frame, $a$, as indicated in Figs. 3, 4, and 8. The diameter of the gear-wheel, G', is five times that of the pinion, $m$, so that the five complete rotations of the pinion produce one complete rotation of the gear-wheel in the direction indicated by the arrow at its margin in Fig. 4. The gear-wheel is provided with a transversely projecting pin, $p^4$, adapted to strike the pawl $p'$, at the proper point in the rotation of the gear wheel and thus to release the pin, $p$, of the transmitter. The position of the pin at the commencement of the operation of the transmitter at the calling telephone is that indicated in Fig. 4, the pin being in contact with the edge of the pawl, $p$. The rotation of the gear-wheel, G', of the device at the receiving telephone carries the pin first away from the pawl, $p'$, and then toward it, and as the arm, D, of the transmitter at the calling telephone completes its rotation the pin strikes the pawl, pushes it away from its normal position beneath the pin, $p$, and permits the transmitter at the called telephone to make a complete rotation. The rotation of this transmitter operates on the recording mechanism at the calling telephone in precisely the manner hereinbefore described, the connection of each transmitter with the recorder at the opposite end of the line being the same. This operation causes the recorder at the calling telephone to print upon its tape the number on which the transmitter at the called telephone is set, and this number, as has already been said, may be either the number of the called telephone or any other number chosen in any desired manner.

It is apparent that the mechanism thus far described when once set in operation would continue to operate so long as the clock-work of the transmitting and recording mechanisms had force to rotate the parts, each transmitter being set in motion by the recorder at its own end of the line and each recorder being operated by the transmitter at the opposite end of the line. It is, of course, desirable however to confine the movement of the mechanisms to one complete cycle at the time, or, in other words, to stop the rotation of the parts when the impulse begun at the transmitter at the calling telephone has passed through the recorder and transmitter at the opposite end of the line and back to the recorder at the calling telephone. For this purpose it is necessary to provide a stop for the rotating mechanism of the calling transmitter in addition to the pawl, $p'$, which is adapted to be thrown out of place by the rotation of the gear-wheel, G', of the calling transmitter. Such a stop is shown in Fig. 3, in which $s'$ is a sliding rod provided at its outer end with a knob, $k'$, its inner end being adapted to be pushed under the pin, $p$, and thus to prevent rotation of the clock-work and the arm, D. When all the parts of the device are in their normal positions, the pawl, $p'$, is beneath the pin, $p$, as shown in Fig. 4, and the sliding stoop, $s'$, is drawn outward as shown in Fig. 3. The transmitting mechanism at the calling telephone is set in operation by drawing the knob, $k$, outward and thus withdrawing the pawl, $p'$, from its position under the pin, $p$, and permitting the mechanism to rotate. As soon as the rotation has begun, the moving stop, $s'$, is pushed inward to bring its inner end in the path of the pin, $p$, and when the rotation of the arm, D, is complete, the pin, $p$, rests upon the inner end of the stop and its further rotation is thus prevented. The recording mechanism at the called telephone is actuated by the rotation of the calling transmitter in the manner already described and starts the rotation of the transmitting mechanism with which it is directly connected in the manner already explained. The rotation of the transmitting mechanism of the called telephone operates the recorder at the calling telephone, rotating its shaft, M, and pinion, $m$, and through them rotating also the loose wheel, G', of the transmitter at the calling telephone. The rotation of the wheel, G', brings its pin, $p^4$, against the corresponding pawl, $p'$, and pushes it out of place, but the presence of the stop, $s'$, prevents any further rotation of the transmitter at the calling telephone and thus ends the cycle of movement of the device.

The construction and arrangement of electrical connection making up the circuits heretofore referred to are illustrated in Figs. 1, 3, 5 and 7, and will now be described in detail. On the plate, A, is a ring, R, of conducting metal connected by a wire, W, with a battery and connected by a brush, $D^3$, with the plate, $d^2$, with which the two brushes, D', $D^2$, are normally in contact. The brush, D', is connected by a wire, W', with the plate, $d$, at the inner end of the arm, D, this plate being in electrical contact with the shaft, C, which, in turn, is in electrical contact with the frame, $a$, the frame being connected with a ground wire, $W^2$, Figs. 3 and 5. The brush, $D^2$, is connected by a wire, $W^3$, with a sleeve, T, insulated from the shaft, C, and connected by a brush, $D^4$, and wire, $W^4$, with the telephone line, $W^5$. The plate, $d'$, is connected by a wire, $W^6$, with a second sleeve, T', insulated from the shaft, C, the sleeve being connected by a brush, $D^5$, and wire, $W^7$, with the battery. When the brush, D', is passing under one of the pins, P, it is pressed down against the plate, $d'$, and closes a circuit in which the current passes from the battery through the wire, W, ring, R, brush, $D^3$, plate, $d^2$, brush, $D^2$, wire, $W^3$, sleeve, T, brush, $D^4$, wire, $W^4$, telephone line, $W^5$, galvanometer coil, E, and thence to the ground back through the ground wire, $W^2$, the frame, the shaft, C, the plate, $d$, the wire, W', the brush, D', the plate, $d'$, the wire, $W^6$, the sleeve, T', the brush, $D^5$, and the wire, $W^7$, to the battery. On the other hand, when the brush, $D^2$, in passing under one of the pins, P', is pressed down against the plate, $d'$, it closes a circuit in which the current passes from the battery through the wire, W, ring, R, brush, $D^3$, plate, $d^2$, brush, $D^2$, wire, W', plate, $d$, shaft, C, frame, $a$, and wire, $W^2$, to the earth, thence through the galvanometer coil, E, in a direction opposite to that of the current in the former circuit and thence through the telephone wire, $W^5$, wire, $W^4$, brush, $D^4$, sleeve, T, wire, $W^3$, brush, $D^2$, plate, $d'$, wire, $W^6$, sleeve, T', brush, $D^5$, and wire, $W^7$ to the battery. The ends of the galvanometer coil are represented in Fig. 6 by the letters $e$, $e'$, one of which leads to the telephone wire and the other to the ground. The circuit which includes the two electro-magnets, F, F', is clearly indicated in Fig. 6, in which, $W^8$, is a wire leading from the local battery to the galvanometer frame with which the needle, N, is in electrical contact. The pin, $P^2$, is one of the terminals of the wire, $W^9$, which passes to the coils of the magnet, F, and thence to a binding post, $P^4$, where it connects with the wire passing to the local battery. The pin, $P^3$, is the terminal of a wire, $W^{10}$, which passes to and around the magnet, F', and thence to the binding post, $P^4$, where it is connected with a wire passing to the same battery, the connection of the two electro-magnets with the needle and the battery being graphically indicated in Fig. 9.

An examination of Fig. 1 will show that the galvanometer at each station is in circuit with the transmitter of the same station and that in consequence the operation of each transmitter will operate its own recording mechanism and thus print its own number on the tape at its own station. This is, of course, not a serious difficulty, but I have thought is best to avoid it by forming each galvanometer coil with a break adapted to be closed so long as the transmitter of the same station is at rest, but to be open whenever the transmitter is in motion. The means by which this is accomplished are shown in Figs. 4 and 6, in which, $e^2$, $e^3$ represent the two ends formed by the break in the galvanometer wire. The ends of the two wires, $e^2$, $e^3$, are connected with vertical conducting rods, E', $E^2$, one of which is rigid and the other so hinged as normally to hang out of contact with the first. The swinging rod, E', is pivoted at its lower end with a light spring, $e^4$, of metal or rubber, which impinges upon a pin, $p^5$, on the same wheel as the pin, $p$, the pin, $p^5$, being so placed that when the pin, $p$, rests upon the pawl, $p'$, the pin, $p^5$, presses the spring toward the stationary rod, $E^2$, and holds the swinging rod, E', in contact therewith, thus closing the break in the galvanometer coil. As soon, however, as the transmitting mechanism begins to rotate the pin, $p^5$, slips over a spring, $e^4$, and allows the rod, E', to swing away from the rod, $E^2$, thus opening the break in the galvanometer coil and breaking the circuit of which the coil forms a part.

I have found it desirable to form the telephone wire with a break and a switch adapted to throw the wire either into the telephone circuit or the call-recording circuit. Such breaks and switches are shown in Fig. 1, in which, $P^5$, $P^6$, are two binding posts forming the terminals at the break in the telephone wire and $P^7$ is a binding post forming the terminal of wires from the galvanometer coil and the transmitter. A switch, B, pivoted on the post, $P^6$, may be swung into contact with either of the posts, $P^5$, $P^7$, and thus close either of the circuits. When the owner or user of a telephone is in his office, the switch, V, connects the terminals, $P^5$, $P^6$, but when he goes out he turns the switch so as to connect the terminals, $P^6$, $P^7$. When the call is sent to any given telephone and no reply is received, the switch, V, at the calling telephone is swung into the position shown in Fig. 1, and the transmitter at that station is then in electrical connection with the telephone wire.

Having now described and explained my invention, what I claim as new, and desire to secure by Letters Patent, is—

1. The combination with a telephone wire, of a transmitting mechanism and a recording mechanism located at one end of the wire, and a corresponding transmitting mechanism and recording mechanism located at the opposite end of the wire, all of said mechanisms being electrically connected with the wire, the recording mechanism at either end of the wire being adapted to transmit electrical impulses of predetermined number and arrangement to the recording mechanism at the opposite end of the wire, and the recording mechanism being adapted to print characters corresponding in number and arrangement to said impulses and being further adapted at a predetermined stage of its operation to initiate the operation of the transmitting mechanism contiguous to it, whereby the latter may transmit a predetermined series of electrical impulses to the recording mechanism at the opposite end of the wire and thereby cause it to print characters determined by said impulses.

2. The combination with a telephone wire, of two sets of instruments located at its opposite ends, each set comprising a telephone, a transmitting mechanism and a recording mechanism and switches located at the opposite ends of the wire, and each adapted to electrically connect the corresponding end of the wire with the corresponding telephone, or the corresponding transmitter and recorder, each transmitting mechanism being adapted to transmit impulses of predetermined number and arrangement to the recorder at the opposite end of the wire and each recorder being adapted to print characters corresponding to said impulses and also at a predetermined step in its operation to initiate the operation of the transmitter contiguous to it, whereby the latter may transmit a predetermined series of impulses to the recorder at the opposite end of the wire.

3. The combination with a suitable conducting wire forming part of an electrical circuit, of a series of dials, each marked with a series of digits, a corresponding series of spools arranged about a common center and adapted to be adjusted and to indicate their adjustment upon said dials, lines of pins mounted upon each of said spools and varying in number to correspond with the units represented by the digits on the dial, a rotating brush adapted to strike in succession the pins brought into its path by the adjustment of the spools and in passing each pin to close said circuit and send an electrical impulse over said wire and a recording mechanism also lying in said circuit and adapted to print characters corresponding to the number and arrangement of said impulses; substantially as shown and described.

4. The combination with a suitable conducting wire in electrical circuit, of a series of spools located about a common center and susceptible of rotation, lines of pins mounted on each of said spools and varying regularly in number from 0 to 9, a series of dials corresponding to the series of spools and marked with the digits, each of said dials being connected with the corresponding spool, and adapted to indicate the position thereof, a series of stationary pins placed between said spools, two brushes rotating together about the common center of the spools and adapted one to make contact with lines of pins on the spools when adjusted into its path of rotation and the other to make contact with said stationary pins, a recording mechanism including a printing wheel provided with type corresponding to the digits on each of the dials and means for printing an impression from a type on said wheel when brought into a suitable position, the contact of said first mentioned brush with the pins upon a spool being adapted to transmit corresponding series of impulses over said wire and thereby to adjust said printing wheel and the contact of said second brush with each of said stationary pins being adapted to send an impulse over said wire and actuate the printing mechanism.

5. The combination with a telephone wire of two transmitting mechanisms and two recording mechanisms, one transmitter and one recorder being mounted together at each of its ends and adapted to be electrically connected with it, each transmitting mechanism comprising a series of numbered dials, corresponding series of spools carrying lines of pins corresponding in number to the digits on the dials, and adjustable in unison with the dials respectively, stationary pins placed between the spools, two brushes rotating together about a common center and adapted to make contact, one with the pins on the spools and the other with said stationary pins and thereby to transmit impulses over said wire, clock-work adapted to rotate said brushes and means for starting and stopping said clock-work and each recording mechanism including a type-wheel, two electro-magnets adapted to be energized by the impulses transmitted through the contacts of said brushes, respectively, an armature adapted to be attracted by either of said electro-magnets when so energized, means connecting said armature with said type-wheel, whereby each movement of the armature in one direction rotates the type-wheel through a given angle, a train of clock-work adapted when rotated to operate said type-wheel and print impressions therefrom and means connected with said armature and adapted when the armature moves in one direction to start said clock-work and initiate the printing of an impression by said type-wheel.

6. The combination with a telephone wire, of the printing mechanism constructed substantially as shown and described, the two electro-magnets, F, F', adapted to operate the printing mechanism, the galvanometer coil, E, in circuit with the telephone wire, the needle, N, adapted when oscillated in one direction to close a circuit through one of said electro-magnets, and when oscillated in the opposite direction to close a circuit through the other, the spools, S, S, &c., carrying rows of pins, P, P, &c., the stationary pins P', P', and the rotating brushes, D', D², adapted to make contacts with the pins, P, P', respectively, and thereby to transmit electrical impulses in opposite directions through said galvanometer coil, whereby the needle may be oscillated in opposite directions; substantially as set forth.

7. The combination with a telephone wire of two transmitting mechanisms electrically connected with the opposite ends of said wire and two recording mechanisms also electrically connected with the opposite ends of the wire and each mechanically connected with the corresponding transmitting mechanism, and two movable stops connected with each transmitting mechanism and adapted to prevent the movement thereof, each of said transmitting mechanisms being adapted to send electrical impulses over said wire to the recording mechanism at the opposite end thereof, each recording mechanism being adapted to print characters corresponding to the number and arrangement of said impulses, one of said stops being adapted to be operated by the corresponding recording mechanism and thus to permit operation of the transmitting mechanism and the other of said stops being movable independently of the recording mechanism and being controlled directly by the operator of the device, substantially as shown and described.

8. The combination with a telephone wire, two transmitting mechanisms connected with its opposite ends and two recording mechanisms also connected with its opposite ends, of two electro-magnets adapted to operate each of said recording devices, a galvanometer needle adapted to be oscillated in either direction by the passage of a current about it, two electric circuits including said electro-magnets, respectively, and each adapted to be closed by the oscillation of the needle in the proper direction and two galvanometer coils encircling said needles, respectively, and each formed with a break adapted to remain closed as long as the corresponding transmitter is not in operation but to be opened when the transmitter begins to operate.

In witness whereof I hereunto set my hand at Chicago, Illinois.

WILLIAM B. THOMSON.

In presence of—
CHARLES O. SHERVEY,
N. A. ROGERS.